(12) United States Patent
Sherlock et al.

(10) Patent No.: US 10,069,745 B2
(45) Date of Patent: Sep. 4, 2018

(54) LOSSY FABRIC TRANSMITTING DEVICE

(71) Applicant: Hewlett Packard Enterprise Development LP, Houston, TX (US)

(72) Inventors: Derek Alan Sherlock, Boulder, CO (US); Gary B. Gostin, Plano, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 44 days.

(21) Appl. No.: 15/263,228

(22) Filed: Sep. 12, 2016

(65) Prior Publication Data

US 2018/0077074 A1 Mar. 15, 2018

(51) Int. Cl.
*H04L 12/823* (2013.01)
*H04L 12/863* (2013.01)
*H04L 12/24* (2006.01)

(52) U.S. Cl.
CPC .......... *H04L 47/32* (2013.01); *H04L 41/0654* (2013.01); *H04L 47/50* (2013.01)

(58) Field of Classification Search
CPC ............. H04L 2012/5648; H04L 47/32; H04L 41/654; H04L 47/50
See application file for complete search history.

(56) References Cited

U.S. PATENT DOCUMENTS

| | | | | |
|---|---|---|---|---|
| 5,231,633 A | * | 7/1993 | Hluchyj | H04J 3/247 370/355 |
| 5,373,504 A | * | 12/1994 | Tanaka | H04L 12/5602 370/248 |
| 5,953,318 A | * | 9/1999 | Nattkemper | H04L 49/103 370/236 |
| 6,353,898 B1 | | 3/2002 | Wipfel et al. | |
| 6,606,301 B1 | * | 8/2003 | Muller | H04L 47/10 370/230 |
| 6,754,206 B1 | * | 6/2004 | Nattkemper | H04L 49/103 370/369 |
| 6,980,516 B1 | * | 12/2005 | Wibowo | H04L 47/10 370/235 |
| 8,117,618 B2 | | 2/2012 | Holloway et al. | |
| 8,184,626 B2 | | 5/2012 | Scott et al. | |

(Continued)

FOREIGN PATENT DOCUMENTS

WO WO2010100837 9/2010
WO WO2015095287 6/2015

OTHER PUBLICATIONS

Huang, P.K. et al., A Low-Complexity Congestion Control and Scheduling Algorithm for Multihop Wireless Networks with Order-Optimal Per-Flow Delay. (Aug. 1, 2014).

*Primary Examiner* — Ayaz Sheikh
*Assistant Examiner* — Debebe Asefa
(74) *Attorney, Agent, or Firm* — Rathe Lindenbaum LLP

(57) ABSTRACT

A lossy fabric transmitting device includes a queue, a link transmitter to transmit packets from the queue, a trigger mechanism to automatically discard a packet contained in the queue in response to satisfaction of a packet dropping threshold and a discard counter to track packets being discarded from the queue. The discard counter has a failure detection threshold. The discard counter resets in response to the link transmitter transmitting a packet. Satisfaction of the failure detection threshold identifies the link transmitter as being immediately adjacent a failed link of a lossy fabric.

16 Claims, 3 Drawing Sheets

(56) References Cited

U.S. PATENT DOCUMENTS

| | | | |
|---|---|---|---|
| 8,925,335 B2 * | 1/2015 | Gooden | ............. F25C 5/08 62/73 |
| 2004/0114524 A1 | 6/2004 | Depta et al. | |
| 2010/0312928 A1 | 12/2010 | Brownell et al. | |

* cited by examiner

LOSSY FABRIC TRANSMITTING DEVICE

BACKGROUND

Fabric-based computer systems transmit data, in the form of packets, to various destination nodes across links and switches. Identifying and addressing failures in the fabric, especially in lossy fabric topologies, may be costly and difficult.

DETAILED DESCRIPTION OF EXAMPLES

Figure 1:
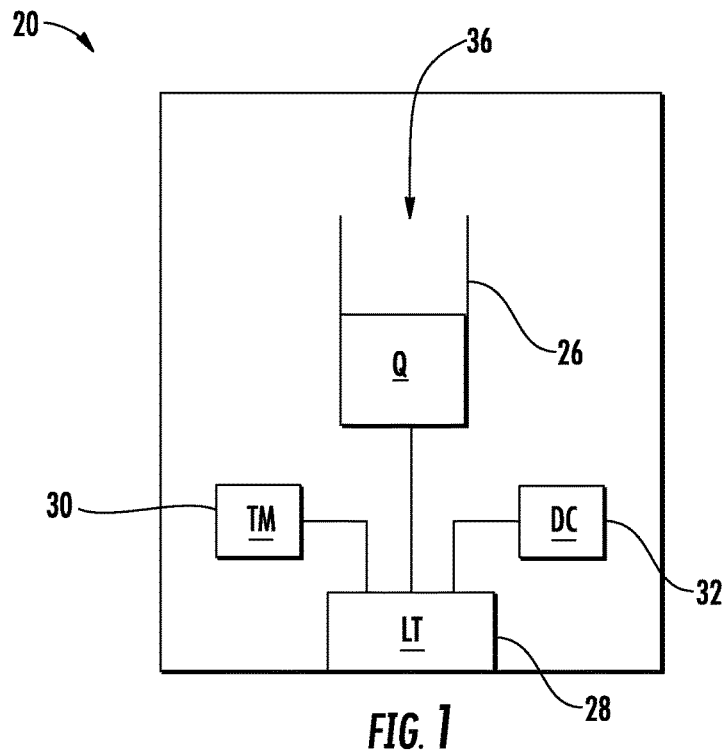
FIG. 1 is a schematic diagram of a portion of an example lossy fabric transmitting device.

In a packet-switched fabric, packets are passed between endpoints across multiple multi-hop routes, across many links and switches. A "hop" refers to the transfer of a packet (or flow control digit (flit)) across a link between components such as between a source component and a switch, between consecutive switches, or between a switch and a destination component. For purposes of this disclosure, the term "packet" encompasses both packets and their smaller pieces, such as flits. If any fabric component along a route fails, components upstream of the failed component may not receive credits and may be unable to transmit or forward packets. Once the queue of the upstream component fills, the upstream component itself may no longer be able to issue credits, resulting in a further upstream component being unable to transmit or forward packets. As a result, traffic back pressure occurs not only at the link immediately proximate to a failed component, but may also occur at more remote upstream links. In the absence of a mechanism to relieve this backpressure, a component failure may in this way render many fabric routes unusable, even routes that do not rely upon the failed component. A system designed with redundant routes for reliability might not be able to take advantage of the redundant routes, thus defeating the reliability objectives of the redundancy.

To address such back pressure, prior packet-switched fabrics have utilized hierarchical back pressure timer thresholds, wherein a queue is emptied of packets in response to packets no longer being transmitted from the queue for a predetermined timeout threshold and wherein queues progressively farther away from the end of routes have larger timeout thresholds. However, such hierarchical timers have severe limitations to their use. First, hierarchical timers are only meaningful in lossless fabric. In a lossy fabric, packet dropping defeats hierarchical timers.

Second, hierarchical timers require hierarchical fabric topologies. The hierarchy of timer settings has to match the hierarchy of fabric connectivity: lowest settings on last-hop of routes, next higher setting on second-last-hop of routes, etc. If the topology itself is not amenable to this (e.g. it comingles, on a single link, last-hop traffic for one route with third-last-hop traffic of another route), then hierarchical backpressure timeouts are difficult if not impossible.

Lossy link-layer fabrics may drop or discard an occasional packet, without loss of correct behavior at higher protocol layers. At each link transmitter, a forward progress timer (sometimes synonymously referred to as a back pressure timer) detects a duration of time when both of the following conditions simultaneously apply: (1) packets are waiting to be sent out on the link and (2) no credits exist to send those packets. The timer is reset when one or more credits are received that permit a packet to be sent. The timers also reset when no packets are waiting to be sent. When the timer satisfies a predetermined packet dropping timer threshold, a packet in the queue, such as the oldest packet in the queue, is dropped or discarded. By dropping/discarding a packet when such conditions occur, the lossy link layer fabric ensures that the packets in the queues feeding a transmitter move at some minimum rate, even if no packets are ever successfully transmitted. As a result, upstream links feeding into the queue also experience non-zero minimum rate of forward progress of the packets through the fabric.

The present disclosure describes a lossy fabric transmitting device that facilitates the identification of the actual link of the fabric that has failed and/or those link transmitters immediately adjacent the failed link. By identifying the actual link in the fabric that has failed, corrective actions may be taken to greatly enhance the rate at which packets are transmitted across the fabric. In one implementation, a link transmitter immediately adjacent to the identified failed link is converted to a "bit bucket", wherein the link transmitter is placed in a mode where all packets in the queue or queues served by the link transmitter and all subsequent packets attempting to transverse the link from the link transmitter are immediately dropped or discarded, unclogging the lossy fabric.

As will be described hereafter, the lossy fabric transmitting device identifies the actual link of the fabric that has failed by utilizing a discard counter that tracks the discarding of packets that occurs at each link transmitter as a result of the timer triggering the automatic dropping or discarding of the oldest packet in a queue served by the link transmitter. The discard counter is reset each time one or more credits are received. As those link transmitters immediately adjacent a failed link never receive a credit, the discard counter is not reset in those transmitters proximate to a point of failure. By way of contrast, link transmitters more distant to the point of failure periodically receive credits and periodically transmit a packet, due to the dropping of packets in downstream components.

When the discard counter associated with the link transmitter satisfies the predefined failure detection threshold, the link transmitter is identified as being immediately adjacent to a failed link. The failure-detection threshold and packet-dropping timer threshold are chosen such that failure-detection threshold can never be satisfied in any transmitter that drives a link to a healthy proximal downstream component. The rate at which packets are discarded in the downstream component's transmitter is determined by the packet-dropping timer threshold, and this in turn determines the minimum rate at which credits refunded to all upstream links that fan-in to the transmitter.

For example, in one implementation a device may comprise a downstream component that has a fan-in of 10 (i.e. it is a switch in which packets from ten incoming links converge on a single output-link transmitter). If the device implements round-robin arbitration, every input will receive at least one refunded credit for every tenth packet dropping event at the output. Both components use identical thresholds (i.e. hierarchical settings are neither used nor required). Provided the chosen failure-detection count threshold is >10, normal operation will ensure that the upstream component's transmitter never reaches the failure-detection counter threshold. On the other hand, if the downstream component fails in a manner where it never returns credits, the upstream component's transmitter will reach the failure-detection threshold.

FIG. 1 schematically illustrates a portion of an example communications fabric back pressure timeout transmitting device 20. Device 20 is especially suited for relieving back pressure in a lossy packet-switched fabric. For purposes of this disclosure, a "lossy fabric" refers to a communications fabric that has link transmitters that automatically discard or drop a packet in response to a threshold of a trigger mechanism being satisfied. In some implementations, the trigger mechanism may comprise a forward progress timer. In one implementation, device 20 comprises a switch (also sometimes referred to as a crossbar) or a packet source such as a processing chip.

As shown by FIG. 1, the portion of device 20 illustrated comprises queue 26, link transmitter 28, trigger mechanism 30 and discard counter 32. Queue 26 comprises a memory buffer that temporarily stores data packets awaiting arbitration or forwarding to link transmitter 28. Queue 26 is designated to receive packets from an input 36 and temporarily store those packets awaiting transmission by transmitter 28.

Link transmitter 28 comprises electronics or hardware that transmits or outputs a packet from device 20. Link transmitter 28 is associated with trigger mechanism 30. Trigger mechanism 30 comprise electronics or hardware that causes link transmitter 28 to automatically drop or discard a packet in response to satisfaction of a packet dropping threshold being exceeded while waiting to receiving credits to send packets from within queue 26. In one implementation, trigger mechanism 30 comprises a forward progress timer. Each time the packet dropping timer threshold associated with trigger mechanism 30 is satisfied, trigger mechanism 30 causes link transmitter 28 to drop or discard a packet. The trigger mechanism 30 resets each time it results in a packet being dropped, but the entire detection and dropping sequence occurs repeatedly if credits are not received for a period of time which spans multiple time the packet dropping threshold time. As a result, in the lossy fabric in which device 20 is employed, upstream devices, whether a switch or a source, continue to receive a credit to transmit packets to input 36 and queue 26. The issuance of credit and the upstream transmission of packets continues such that the entire route along which device 20 is located experiences a non-zero rate of forward progress.

Discard counter 32 comprises electronics or hardware associated with link transmitter 28 that tracks the discarding of packets by transmitter 28 in response to signals from trigger mechanism 30. Discard counter 32 is reset in response to the issuance of a credit to link transmitter 28 by the next consecutive device. In response to the discard counter 32 satisfying the second threshold, a failure detection threshold, link transmitter 28 is identified as being immediately adjacent a failed downstream link.

In one implementation, in response to the discard counter satisfying the failure detection threshold, link transmitter is automatically activated to a state or mode in which link transmitter 28 automatically drops or discards all of the packets within queue 26. In one implementation, in response to the discard counter satisfying the failure detection threshold, link transmitter is automatically activated to a state or mode in which link transmitter 28 automatically drops or discards all the packets within queue 26, all of the packets in any other queues served by link transmitter 28 and all future received packets received by queue 26 or other queues serviced by link transmitter 28, effectively turning link transmitter 28 into a "bit bucket". As a result, multiple packets are discarded from queue 26 and any other queues 26 that feed packets to transmitter 28, resulting in multiple credits being issued to upstream devices in the lossy fabric. The upstream devices may then transmit multiple packets (rather than just a single packet), facilitating greater progress of packets upstream of device 20 and across the lossy fabric.

In one implementation, discard counter 32 determines a counter value based upon packets being discarded from the queue. In one implementation, the counter counts up from an initial value to a failure detection threshold as each packet is discarded by the associated link transmitter 28, wherein the counter value of the counter is automatically reset to the initial value in response to link transmitter 28 receiving a credit. In another implementation, the counter counts down from an initial value to a failure detection threshold as each packet is discarded by the link transmitter, wherein the counter value of the counter is automatically reset to the initial value in response to link transmitter receiving a credit for transmission of a packet and/or actually transmitting a packet.

In another implementation, discard counter 32 comprises a timer which tracks a lapse of time, wherein time of the timer is allowed to lapse based upon the discarding of packets and the non-receipt of a credit or failure to transmit a packet by link transmitter 28. For example, in one implementation, a timer may count up to a threshold time so long as packets are being discarded by link transmitter 28 at a predetermined rate that may correspond to the first time threshold used by trigger mechanism 30, wherein the time is reset to initial value once a credit is received or a packet is transmitted by link transmitter 28.

Likewise, in one implementation, the timer may count down to from an initial time value to a threshold time (such as zero) so long as packets are being discarded by link transmitter 28 at a predetermined rate that may correspond to the first time threshold used by trigger mechanism 30, wherein the timer is reset to the initial value once a credit is received or a packet is transmitted by link transmitter 28. Other timing schemes may also be utilized for identifying when the link immediately adjacent the link transmitter 28 may be appropriately identified as a failed link. In each of such implementations, the threshold time being counted up to (and serving as a failure detection threshold) or the initial time being counted down from (and serving at the failure detection threshold) have predetermined values that are large enough such that link transmitters spaced from or remote with respect to a failed link will receive a credit or transmit a packet, under the lossy scheme, prior to satisfying the failure detection threshold.

Although FIG. 1 illustrates a portion of device 20 as comprising a single output or transmitter 28 with the associated single queue 26 and input 36, device 20 may include a greater number of queues that provide packets to link transmitter 28. Device 20 may additionally comprise a greater number of inputs 36 as well as a greater number of link transmitters 28 and associated queues 26. In such implementations, each link transmitter 28 is associated with a trigger mechanism 30 and a discard counter 32 as described above. In implementations where multiple queues are serviced by a single link transmitter, each link transmitter may be further associated with an arbiter and a multiplexer, for controlling the transmission of packets from the different queues to each associated link transmitter 28.

Figure 2:
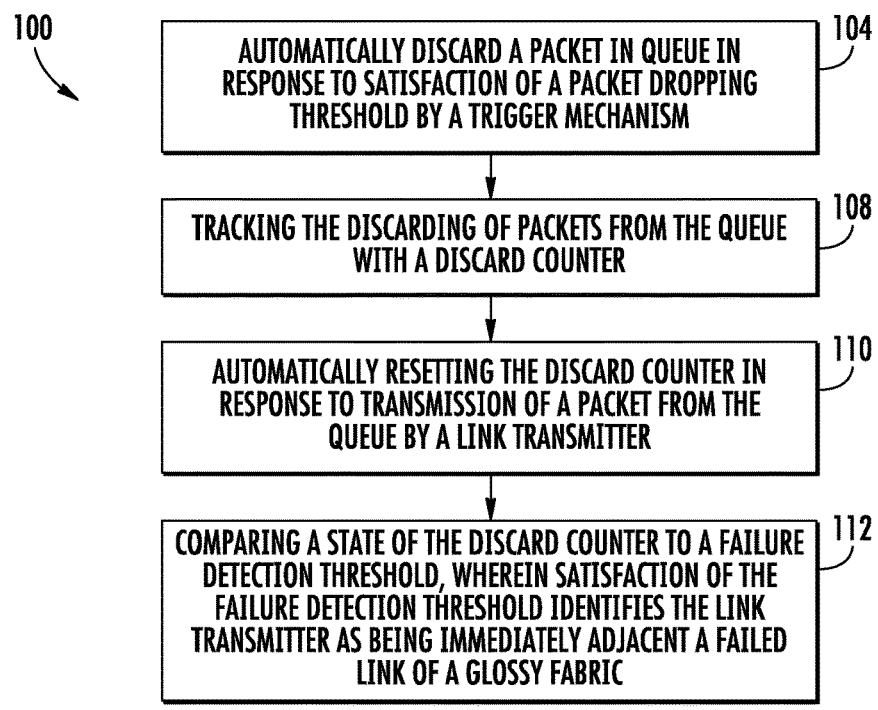
FIG. 2 is a flow diagram of an example method for identifying a failed link in a lossy fabric or for identifying a link transmitter that is immediately adjacent a failed link in the lossy fabric.

FIG. 2 is a flow diagram illustrating an example method 100 for identifying a failed link in a lossy fabric or for identifying a link transmitter that is immediately adjacent a failed link in the lossy fabric. For purposes of description, method 100 is described as being carried out by device 20 described above. In other implementations, method 100 may likewise be carried out by other devices such as the other devices described hereafter.

As indicated by block 104 of FIG. 2, link transmitter 28 automatically discards a packet from queue 26 in response to satisfaction of a first threshold by trigger mechanism 30. In one implementation, link transmitter 28 automatically discards a packet from queue 26 in response to the forward progress timer or back pressure timer of trigger mechanism 30 satisfying the first threshold.

As indicated by block 108, discard counter 32 tracks the discarding of packets from the queue pursuant to block 104. As indicated by block 110, discard counter 32 is automatically reset in response to receipt of a credit and/or the resulting transmission of a packet for by link transmitter 28 from queue 26 or a different queue 26 supplying packs to link transmitter 28. As described above, in some implementations, counter 32 counts up to a failure detection threshold count value or which counts down from a failure detection threshold count value. In yet other implementations, discard counter 32 comprises a timer that counts down from a failure detection threshold time or discounts up towards a failure detection threshold time so long as packets are being discarded by link transmitter 28 at a predetermined rate that may correspond to the first time threshold used by trigger mechanism 30.

As indicated by block 112, the state of the discard counter 32 is continually are periodically compared to a second threshold, the failure detection threshold. The failure detection threshold has a predetermined value that is large enough such that link transmitters spaced from or remote with respect to a failed link will receive a credit or transmit a packet, under the lossy scheme, prior to satisfying the failure detection threshold. The failure detection threshold may vary depending upon the fan-in, arbitration policy, and packet-dropping time threshold of the immediately-downstream component driven by the transmitter.

Upon the satisfaction of the second threshold, the failure detection threshold, link transmitter 28 is identified or treated as being immediately adjacent a failed link of the lossy fabric of which device 20 is part. In one implementation, identification of link 28 as being immediately adjacent a failed link results in link transmitter 28 being actuated to a state or mode in which link transmitter 28 automatically in which link transmitter 28 automatically drops or discards all of the packets within queue 26. In one implementation, in response to the discard counter satisfying the failure detection threshold, link transmitter 28 is automatically activated to a state or mode in which link transmitter 28 automatically drops or discards all the packets within queue 26, all of the packets in any other queues served by link transmitter 28 and all future received packets received by queue 26 or other queues serviced by link transmitter 28, effectively turning link transmitter 28 into a "bit bucket". As a result, multiple packets are discarded from queue 26 and any other queues 26 that feed packets to transmitter 28, resulting in multiple credits (one credit for each discarded packet) being issued to upstream devices in the lossy fabric.

The upstream devices may then transmit multiple packets (rather than just a single packet), facilitating greater progress of packets upstream of device 20 and across the lossy fabric.

Figure 3:
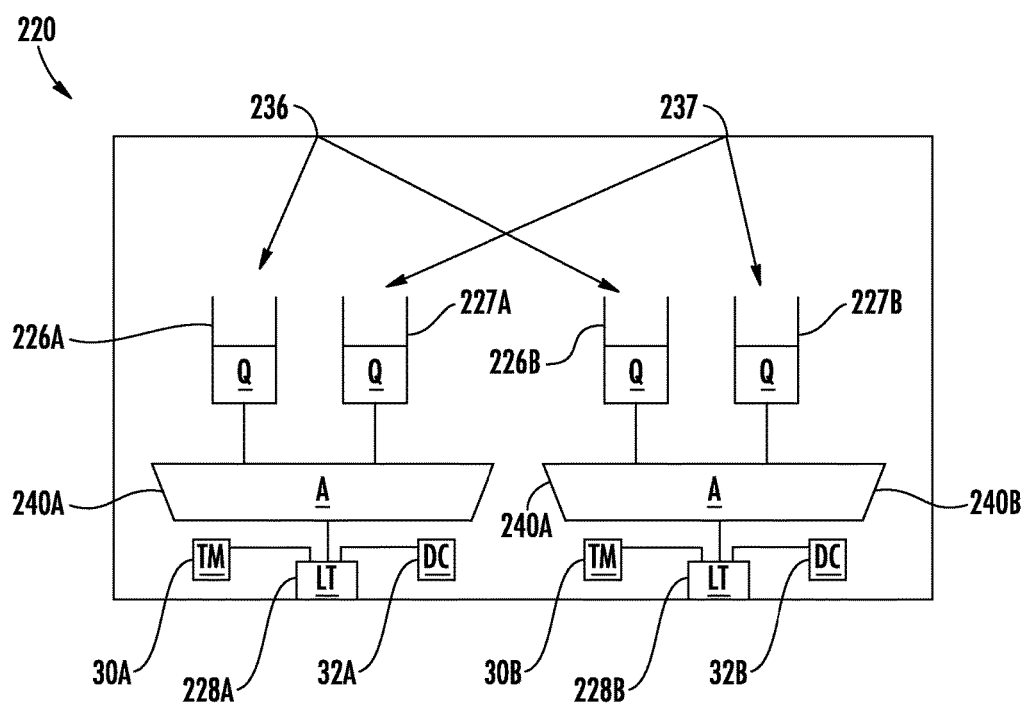
FIG. 3 is a schematic diagram of an example lossy fabric transmitting device.

FIG. 3 schematically illustrates an example communications fabric back pressure timeout transmitting device 220, an example implementation of device 20. Device 320 is similar to device 220 described above except that device 320 is illustrated as a two input, two output switch. Device 320 comprises two outputs or transmitters 228A, 228B (collectively referred to as transmitters 228) and two inputs 236, 237. Each of inputs 228 receives packets for transmission via an arbiter that is connected to multiple queues. In the example illustrated, transmitter 228A receives packets for transmission from arbiter 240A while link transmitter 228B receives packets from arbiter 240B, arbiters 240A and 240B collectively referred to as arbiters 240. In the example illustrated, each of arbiter 240 may comprise a multiplexer.

As further shown by 3, arbiter/multiplexor 240A draws packets from queues 226A and 227A. Arbiter 240B draws packets from queues 226B and 227B. Queues 226A and 226B may receive packets from input 236 queues 227A and 227B may receive packets from input 237. Link transmitters 228A and 228B have associated trigger mechanisms 30A and 30B and associated discard counters 32A and 32B, respectively, which are similar to trigger mechanism 30 and discard counter 32, respectively, of device 20.

In the example illustrated, each of the link transmitters 228 and the associated trigger mechanism 30 and discard counter 32 independently carry out method 100 described above. Each of link transmitters 228 discards a packet in response to the threshold of trigger mechanism 30 being satisfied. The discard counter 32 of each of link transmitters 228 track the discarding of packets by the respective link transmitters 228. In response to the discard counter of a particular link transmitter 228 satisfying and associated predetermined failure detection threshold, the particular link transmitter is converted to a "bit bucket", wherein the particular link transmitter 228 automatically discards all of the packets contained in the associated queues and further discards all subsequently received packets by the associated queues. For example, in response to discard counter 32 associated with link transmitter 228A satisfying the corresponding failure detection threshold, link transmitter 228A discards all of packets contained in queues 226A and 227A and will discard all future packets received by queues 226A and 227A, effectively disabling the link downstream of link transmitter 228A.

As link transmitters 228A and 228B are connected to different downstream links such as different downstream switches or destinations, the actuation of link transmitter 228A to the "bit bucket" mode is independent of the actuation of link transmitter 228B to the bit bucket mode. For example, while transmitter 228A may be in the "bit bucket" mode, the components on the right side of device 220 may continue to operate as usual. For example, link transmitter 228B may continue to transmit packets from either of queues 226B or 227B as dictated by arbiter 240B. link transmitter 228B may continue to operate in the lossy fashion by continuing to discard a packet each time trigger mechanism 30 satisfies threshold, wherein the church 32 will continue to count the discarding of packets by link transmitter 228B in response to the satisfaction of threshold by trigger mechanism 30.

Figure 4:
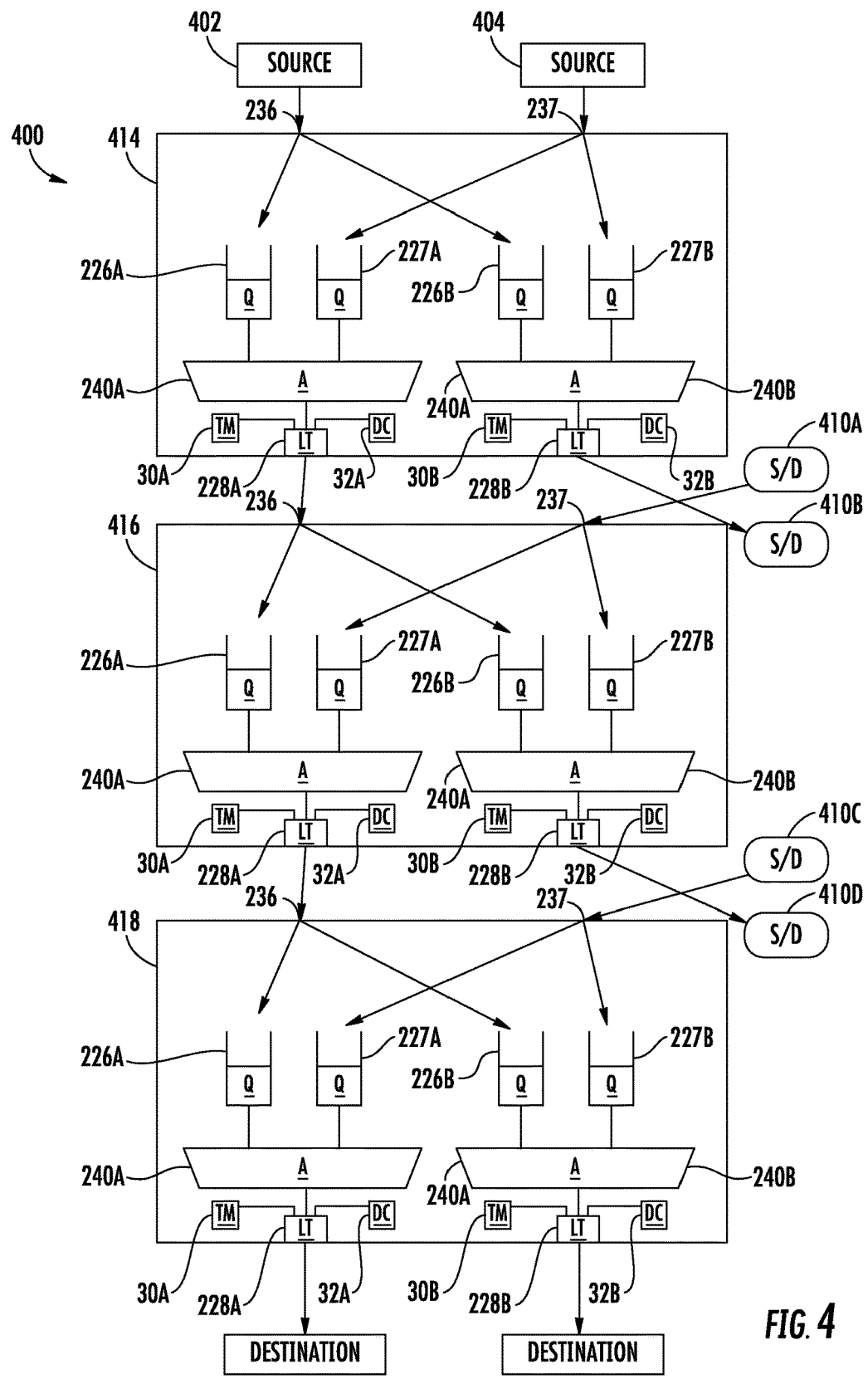
FIG. 4 is a schematic diagram of an example lossy communications fabric including the example lossy fabric transmitting device of FIG. 3.

FIG. 4 schematically illustrates a portion of an example communications fabric 400 In the example illustrated, the portion of fabric 400 is illustrated as comprising sources 402, 404, destinations 406, 408 such as processing chips, devices 410A-410D (collectively referred to as devices 410) which may each comprise either switches or destinations (similar to device 220) and two input-two output switches 414, 416, 418. Each of switches 414, 416, 418 are similar to switch 220 described in FIG. 3. The connections to and from devices 410 are only partially illustrated for purposes of illustration. Each of such devices may be connected to additional switches, sources or destinations (not shown). Each of sources 402, 404 may transmit packets to either of inputs 236 or 337 of switch 414. Transmitter 228A of switch 414 transmits packets to input 236 of switch 416. Transmitter 228B of switch 414 transmits packets to one of devices 410. Input 237 of switch 416 is to receive packets from device 410A. Transmitter 228A of switch 416 is to transmit packets to input 236 of switch 418. Transmitter 228B of switch 416 transmits packets to device 410D. Input 237 of switch 418 is to receive packets from device 410C. Transmitter 228A of switch 418 is to transmit packets to destination 406. Destination 406 may additionally receive packets from other switches and/or processing chips. Likewise, transmitter 228B of switch 418 is to transmit packets to destination 408. Destination 408 may additionally receive packets from other switches and/or processing chips.

As further shown by FIG. 4, switches, such as switches 416 and 418 each have a fan in, a number of multiple receivers or inputs that feed packets to a single output or link transmitter. As a result, the rate of refunding credits on each receiver or input 236, 237 is a fraction of the rate of dropping packets at the transmitter 228A, 228B. Presuming fair or equal arbitration and equal thresholds for the trigger mechanisms 30 of each of the devices (sources 402, 404 as well as switches 414, 416, 418), the rates of refunding credits may be in the same ratio as a number of inputs feeding a particular output. In such implementations, the failure detection threshold for declaring a link dead or failed, for those discard counters of the particular device, are higher than the fan in for the same device to eliminate the possibility of false triggering.

FIG. 4 further illustrates one example of how communications fabric 400, comprising switches 414, 416, 418 may relieve congestion and back pressure of packets resulting from a failed component. FIG. 4 illustrates an example scenario in which switch 418 fails. Upon failure of switch 418, link transmitter 228A of the upstream immediately adjacent switch 416 begins to no longer receive credits for switch 418 (authorizations for the transmission of packets to switch 418). As a result, packets begin to build up within each of queues 226A and 227A of switch 416. During the time at which queues 226A and 227A contain packets and no packets are being transmitted by link transmitter 228A, trigger mechanism 30A of switch 416 runs, counting upwards or counting downwards towards a bit bucket triggering event. For example, in implementations where trigger mechanism 30A comprise a forward progress timer or back pressure timer, the timer runs. The same results and actions occur on the device 410C connected to input 237 of switch 418.

Because link transmitter 228A of switch 416 can no longer transmit packets, link transmitter 228A of 414 no longer receives credits from switch 416 once queue 226A of switch 416 has filled up. As a result, packets begin to build up within each of queues 226A and 227A of switch 414. During the time at which queues 226A and 227A contain packets and no packets are being transmitted by link transmitter 228A, trigger mechanism 30A of switch 414 runs. For example, in implementations where trigger mechanism 30A comprise a forward progress timer or back pressure timer, the timer runs. The same results and actions occur on the device 410 connected to input 237 of switch 416. This chain reaction continues upstream on each device (switches and/or sources) that ultimately transmit packets through link transmitter 228A of the failed switch 418. The same occurs on all upstream devices that all transmit packets through link transmitter 228B of the failed switch 418.

On each of the devices upstream of the failing switch 418, once the trigger mechanism 30 satisfies the associated trigger mechanism threshold, the corresponding link transmitter 228 discards a packet from one of associated queues 226 and 227 and the discarding of an individual packet is tracked by the associated discard counter 32. For example, in response to trigger mechanism 30A of switch 416 satisfying its predetermined threshold, link transmitter 228A of switch 416 will discard a packet. Likewise, in response to trigger mechanism 30A of switch 414 satisfying its predetermined threshold, link transmitter 228A of switch 414 will discard a packet. Each time that a packet is discarded by link transmitter 228A of switch 416, space for a packet will be freed up in either queue 226A or 227A. One or more credits will be issued to either the upstream link transmitter 228A of switch 414 or of the device 410A connected to input 237 of switch 416, resulting in either the discard counter 32A of switch 414 or the discard counter 32 of the connected device 410 being reset. If arbiter 240A of switch 416 operates in round-robin fashion, the issued credits will alternate between going to link transmitter 228A of switch 414 and device 401A, such that each one receives credits at least once for every second time that the link transmitter 228A of switch 416 discards a packet. As a result, the discard counters of those devices that are remote with respect to the failed link (not immediately adjacent the failed link, the failed switch 418) are repeatedly reset such that they do not reach or attain the failure detection threshold.

In contrast, because neither link transmitter 228A nor link transmitter 228B of the failed switch 418 can issue credits, link transmitter 228A of switch 416 does not receives credits and does not transmit packets. As a result, discard counter 32A of switch 416 is not reset, but continues to march towards its associated failure detection threshold. Once the associated failure detection threshold is satisfied by discard counter 32A of switch 416, link transmitter 228A of switch 416 may be identified as a link immediately adjacent to the failed switch 418.

In one implementation, link transmitter 228A of switch 416, as identified as being immediately adjacent to the a failed link, is automatically converted to a "bit bucket", wherein link transmitter 228A automatically discards all the packets contained in queues 226A and 227A of switch 416. All packet subsequently received by queues 226A and 227A of switch 416 are also discarded or dropped by link transmitter 228A of switch 416. The emptying of queues 226A and 227A of switch 416 results in multiple credits being issued to upstream link transmitter 228A of switch 414 and the upstream link transmitter of the device 410 connected to switch 416. As a result, switch 414 and the upstream link transmitter of the device 410 connected to switch 416 are themselves authorized to transmit multiple packets, relieving the congestion of packets in their queues. This release of congestion in the upstream devices continues through all upstream devices ultimately connected to the failed switch 418. As a result, forward progress of packets across the lossy communications fabric 400 is enhanced despite the failed link, switch 418

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. An apparatus comprising:
   a lossy fabric transmitting device comprising:
      a queue;
      a link transmitter to transmit packets from the queue;
      a trigger mechanism to automatically discard a packet contained in the queue in response to satisfaction of a packet dropping threshold; and
      a discard counter to track packets being discarded from the queue, the discard counter having a failure detection threshold, wherein satisfaction of the failure detection threshold identifies the link transmitter as being immediately adjacent a failed link of a lossy fabric and wherein the discard counter resets in response to the link transmitter transmitting a packet.

2. The apparatus of claim 1, wherein the discard counter comprises a counter to determine a count value based upon packets being discarded from the queue.

3. The apparatus of claim 1, wherein the trigger mechanism is selected from a group of trigger mechanisms consisting of a forward progress timer and a back pressure timer.

4. The apparatus of claim 1, wherein the link transmitter is to automatically discard all present and future packets in the queue in response to satisfaction of the failure detection threshold.

5. The apparatus of claim 1 further comprising:
   the lossy fabric; and
   a second lossy fabric transmitting device comprising:
      a second queue;
      a second link transmitter to transmit packets from the second queue;
      a second trigger mechanism to discard a packet contained in the queue in response to satisfaction of a second packet dropping threshold; and
      a second discard counter to track packets being discarded from the second queue, the second discard counter having a second failure detection threshold, wherein satisfaction of the second failure detection threshold identifies the second link transmitter as being immediately adjacent a failed link of the lossy fabric and wherein the second discard counter resets in response to the second link transmitter transmitting a packet.

6. The apparatus of claim 1, wherein the failure detection threshold has a predetermined value such that the failure detection threshold cannot be reached by a device remote from the failed link.

7. The apparatus of claim 1 comprising a number of inputs, wherein the failure detection threshold has a predetermined valued based upon the number of inputs.

8. The apparatus of claim 1 comprising a number of inputs to the queue, wherein the discard counter comprises a counter to count a number of packets that have been discarded from the queue by the link transmitter in response to the trigger mechanism and wherein the failure detection threshold has predetermined value greater than the number of inputs.

9. A fabric failed link identification method comprising:
   automatically discarding a packet in a queue in response to satisfaction of a packet dropping threshold by a trigger mechanism;
   tracking the discarding of packets from the queue with a discard counter;
   automatically resetting the discard counter in response to transmission of a packet from the queue by link transmitter that transmits packets from the queue; and
   comparing a state of the discard counter to a failure detection threshold, wherein satisfaction of the failure detection threshold identifies the link transmitter as being immediately adjacent a failed link of a lossy fabric.

10. The method of claim 9 further comprising automatically discarding all present and future packets in the queue in response to satisfaction of the failure detection threshold.

11. The method of claim 9, wherein the trigger mechanism comprises a forward progress timer and wherein the discard counter comprises a counter to determine a count value based upon packets being discarded from the queue.

12. The method of claim 9 further comprising:
   automatically discarding a packet in a second queue in response to satisfaction of a second packet dropping threshold by a second trigger mechanism;
   tracking the discarding of packets from the second queue with a second discard counter;
   automatically resetting the second discard counter in response to transmission of a packet from the second queue by a second link transmitter that transmits packets from the second queue; and
   comparing a state of the second discard counter to a second failure detection threshold, wherein satisfaction of the second failure detection threshold identifies the second link transmitter as being immediately adjacent a failed link of the lossy fabric.

13. The method of claim 9, wherein the failure detection threshold has a predetermined valued such that the failure detection threshold cannot be reached by a link remote from the failed link.

14. The method of claim 9 comprising a number of inputs, wherein the failure detection threshold has a predetermined valued based upon the number of inputs.

15. A lossy fabric comprising:
   a first lossy fabric transmitting device comprising:
      a first queue;
      a first link transmitter to transmit packets from the first queue;
      a first trigger mechanism to automatically discard a packet contained in the first queue in response to satisfaction of a first packet dropping threshold; and
      a first discard counter to track packets being discarded from the first queue, the first discard counter having a first failure detection threshold, wherein the discard counter resets in response to the first link transmitter transmitting a packet and wherein the first link transmitter is to automatically discard all present and future packets in the first queue in response to satisfaction of the first failure detection threshold; and a second lossy fabric transmitting device comprising:
a second queue;
a second link transmitter to transmit packets from the second queue;
a second trigger mechanism to automatically discard a packet contained in the second queue in response to satisfaction of a second packet dropping threshold; and
a second discard counter to track packets being discarded from the second queue, the second discard counter having a second failure detection threshold greater than the first failure detection threshold, wherein the second discard counter resets in response to the second link transmitter transmitting a packet and wherein the second link transmitter is to automatically discard all present and future packets in the second queue in response to satisfaction of the second failure detection threshold.

16. The apparatus of claim 5, wherein the second failed detection threshold is greater than the first failure detection threshold.

* * * * *